United States Patent
Fahs et al.

(10) Patent No.: US 9,348,762 B2
(45) Date of Patent: May 24, 2016

(54) TECHNIQUE FOR ACCESSING CONTENT-ADDRESSABLE MEMORY

(71) Applicant: NVIDIA CORPORATION, Santa Clara, CA (US)

(72) Inventors: Brian Fahs, Los Angeles, CA (US); Eric T. Anderson, Palo Alto, CA (US); Nick Barrow-Williams, San Francisco, CA (US); Shirish Gadre, Fremont, CA (US); Joel James McCormack, Boulder, CO (US); Bryon S. Nordquist, Santa Clara, CA (US); Nirmal Raj Saxena, Los Altos Hills, CA (US); Lacky V. Shah, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 244 days.

(21) Appl. No.: 13/720,755

(22) Filed: Dec. 19, 2012

(65) Prior Publication Data

US 2014/0173193 A1    Jun. 19, 2014

(51) Int. Cl.
*G06F 12/10* (2006.01)

(52) U.S. Cl.
CPC ........ *G06F 12/1027* (2013.01); *G06F 12/1018* (2013.01)

(58) Field of Classification Search
None
See application file for complete search history.

(56) References Cited

U.S. PATENT DOCUMENTS

| | | | |
|---|---|---|---|
| 6,642,928 B1 | 11/2003 | Deming et al. | |
| 6,649,298 B2 | 11/2003 | Hayashi et al. | |
| 6,851,038 B1 * | 2/2005 | Krolski et al. | 711/207 |
| 6,972,769 B1 | 12/2005 | Nebeker et al. | |
| 7,290,116 B1 * | 10/2007 | Grohoski et al. | 711/216 |
| 7,793,038 B2 * | 9/2010 | Blumrich et al. | 711/105 |
| 2004/0153598 A1 | 8/2004 | Thatipelli et al. | |
| 2004/0172497 A1 | 9/2004 | Liou | |
| 2007/0091089 A1 | 4/2007 | Jiao et al. | |
| 2009/0201711 A1 | 8/2009 | Solomon et al. | |
| 2010/0228912 A1 | 9/2010 | Huang et al. | |
| 2011/0252180 A1 | 10/2011 | Hendry et al. | |
| 2012/0239854 A1 | 9/2012 | Hsueh et al. | |
| 2013/0262787 A1 * | 10/2013 | Santhanam et al. | 711/148 |

FOREIGN PATENT DOCUMENTS

| | | |
|---|---|---|
| TW | I265707 | 11/2006 |
| TW | 200817899 A | 4/2008 |

(Continued)

OTHER PUBLICATIONS

Cho et al., "Design of new XOR—based hash functions for cache memories", pp. 2005-2011, Jul. 2007.*

(Continued)

*Primary Examiner* — Adam M Queler
*Assistant Examiner* — Tracy Chan
(74) *Attorney, Agent, or Firm* — Artegis Law Group, LLP

(57) ABSTRACT

A tag unit configured to manage a cache unit includes a coalescer that implements a set hashing function. The set hashing function maps a virtual address to a particular content-addressable memory unit (CAM). The coalescer implements the set hashing function by splitting the virtual address into upper, middle, and lower portions. The upper portion is further divided into even-indexed bits and odd-indexed bits. The even-indexed bits are reduced to a single bit using a XOR tree, and the odd-indexed are reduced in like fashion. Those single bits are combined with the middle portion of the virtual address to provide a CAM number that identifies a particular CAM. The identified CAM is queried to determine the presence of a tag portion of the virtual address, indicating a cache hit or cache miss.

19 Claims, 10 Drawing Sheets

(56) References Cited

FOREIGN PATENT DOCUMENTS

| TW | 200941496 A | 10/2009 |
| TW | 201037514 A1 | 10/2010 |
| TW | 201235843 A1 | 9/2012 |

OTHER PUBLICATIONS

GPU Gems 2: Chapter 32, "Taking the Plunge into GPU Computing." http://http.developer.nvidia.com/GPUGems2/gpugems2_chapter32.html.

* cited by examiner

TECHNIQUE FOR ACCESSING CONTENT-ADDRESSABLE MEMORY

BACKGROUND OF THE INVENTION

1. Field of the Invention

The present invention generally relates to memory access operations and, more specifically, to a technique for accessing content-addressable memory.

2. Description of the Related Art

A conventional cache memory unit operates in conjunction with a tag unit that maintains virtual address tags associated with data currently residing within the cache memory unit. When processing a memory access request, the tag unit queries one or more content addressable memory units (CAMs) that store these virtual address tags in order to determine whether one of the CAMs includes a virtual address tag associated with the memory access request. Each CAM typically corresponds to a "set" within the cache memory unit. When a given CAM includes the virtual address tag, data associated with that tag resides within a corresponding set within the cache memory (i.e. a cache hit occurs). When a given CAM does not include the virtual address tag, data associated with that tag does not reside within the cache memory at all (i.e. a cache miss occurs).

The tag unit typically employs a particular set hashing function that determines a particular set based on the virtual address tag. Upon determining the particular set, the tag unit may then query the corresponding CAM in the fashion described above and determine whether a cache hit or a cache miss occurred. Typical set hashing functions are closely tied to the expected usage pattern of the cache memory unit. For example, a conventional set hashing function could compute the set for a given virtual address based on an index portion of the virtual address. This approach is sufficient for usage patterns where sequential memory accesses include different index portions, because in such a case, sequential CAM accesses would be distributed across different CAMs.

However, some usage patterns involve non-sequential memory access where the tag portion of each memory access in the sequence changes, yet the index portion remains the same. In these situations, the conventional set hashing function described above identifies just one CAM repeatedly. Consequently, that one CAM may become overloaded with multiple queries, thereby decreasing the speed with which the tag unit is capable of operating. Further, this approach allows the remaining CAMs to be underused, and, thus, does not utilize tag unit resources effectively.

Accordingly, what is needed in the art is a more effective technique for accessing CAM units.

SUMMARY OF THE INVENTION

A computer-implemented method for accessing a memory module within a plurality of memory modules, including parsing a virtual address into a first portion, a second portion, and a third portion, parsing the first portion into even-indexed bits and odd-indexed bits, where each of the even-indexed bits has a different even-numbered index within the virtual address and each of the odd-indexed bits has a different odd-numbered index within the virtual address, reducing the even-indexed bits to a first bit, reducing the odd-indexed bits to a second bit, and generating a memory module number by combining the first bit and the second bit with the second portion, where the memory module number identifies the memory module within the plurality of memory modules.

One advantage of the disclosed technique is that overuse of a particular memory module can be avoided, thereby utilizing the collection of memory modules more efficiently compared to conventional approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
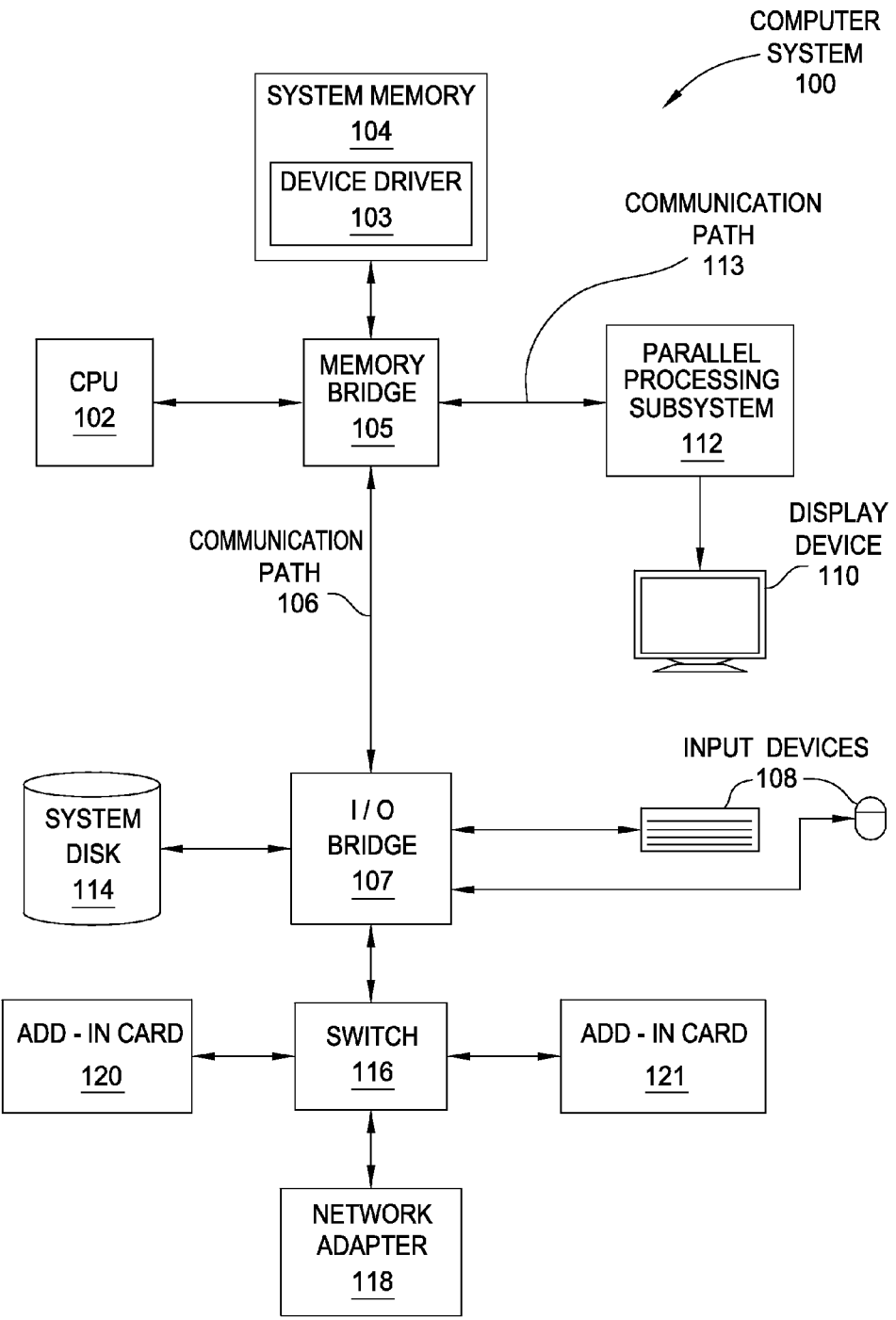
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
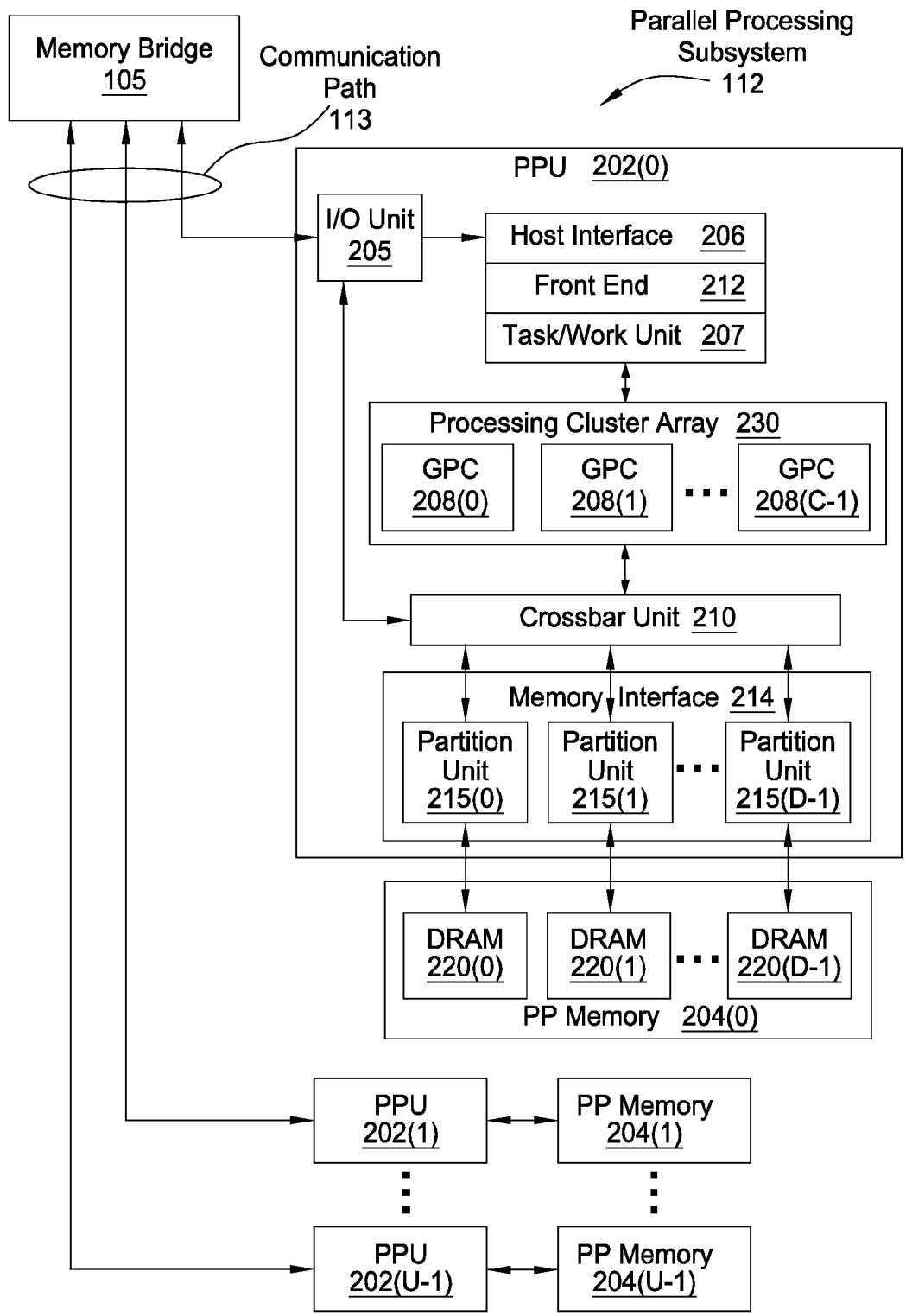
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
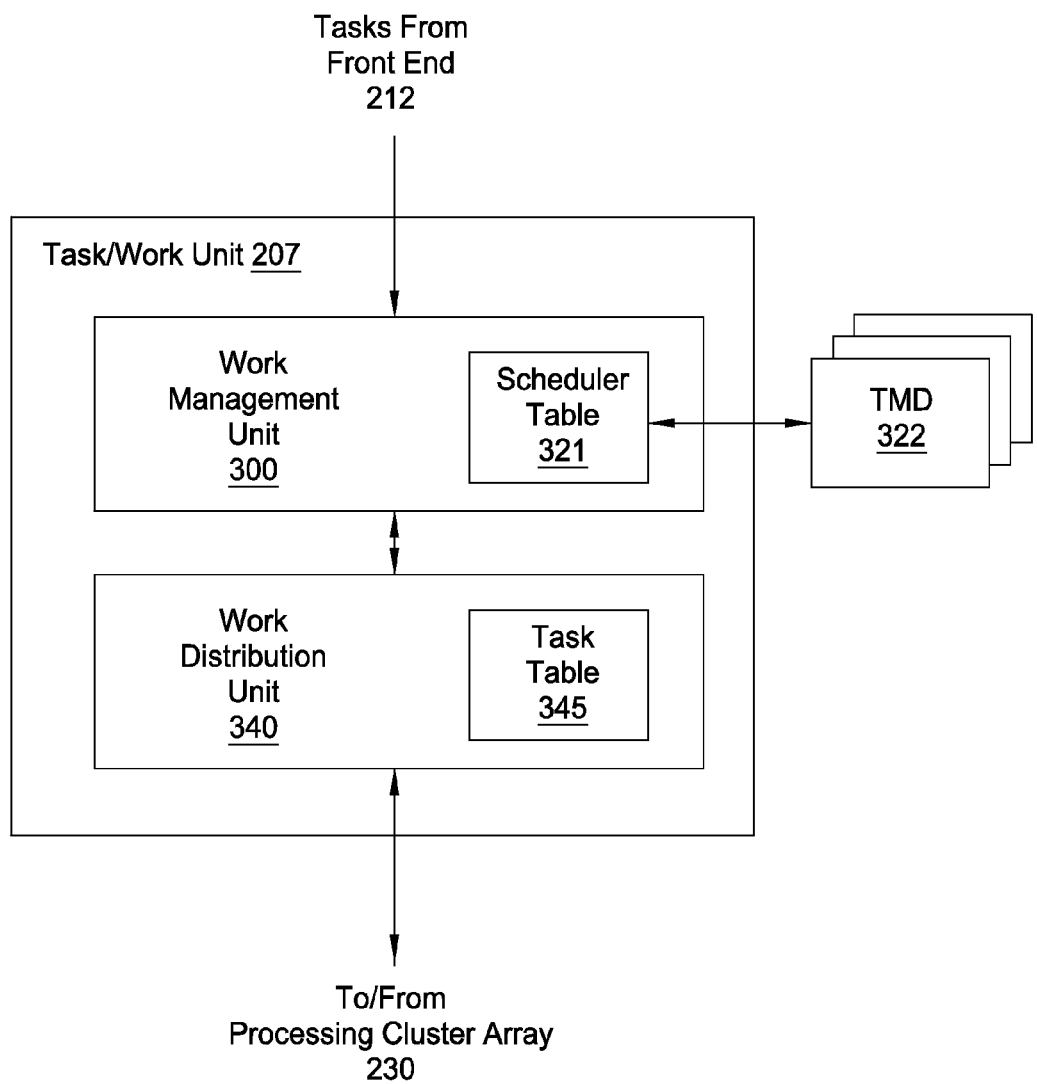
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
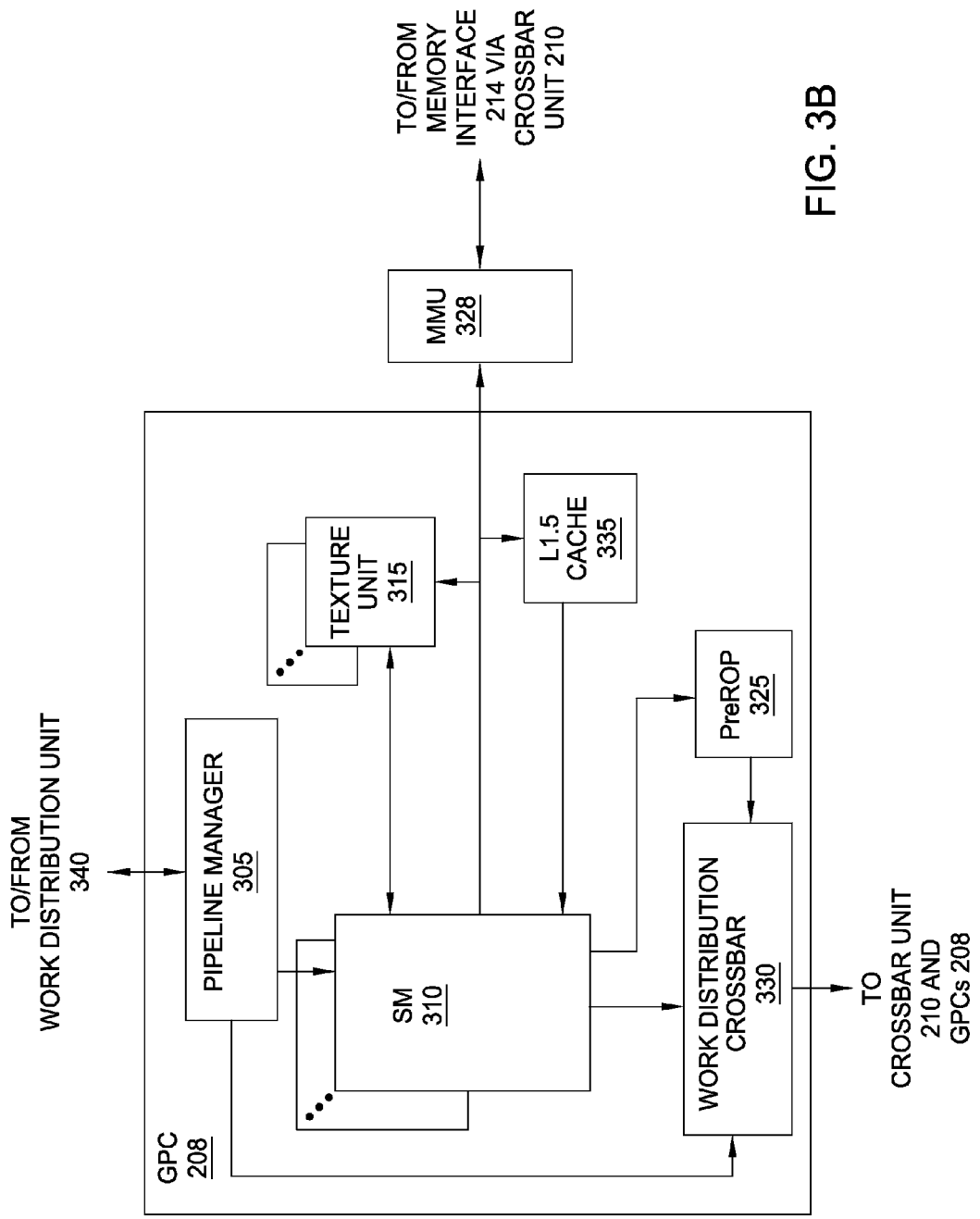
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
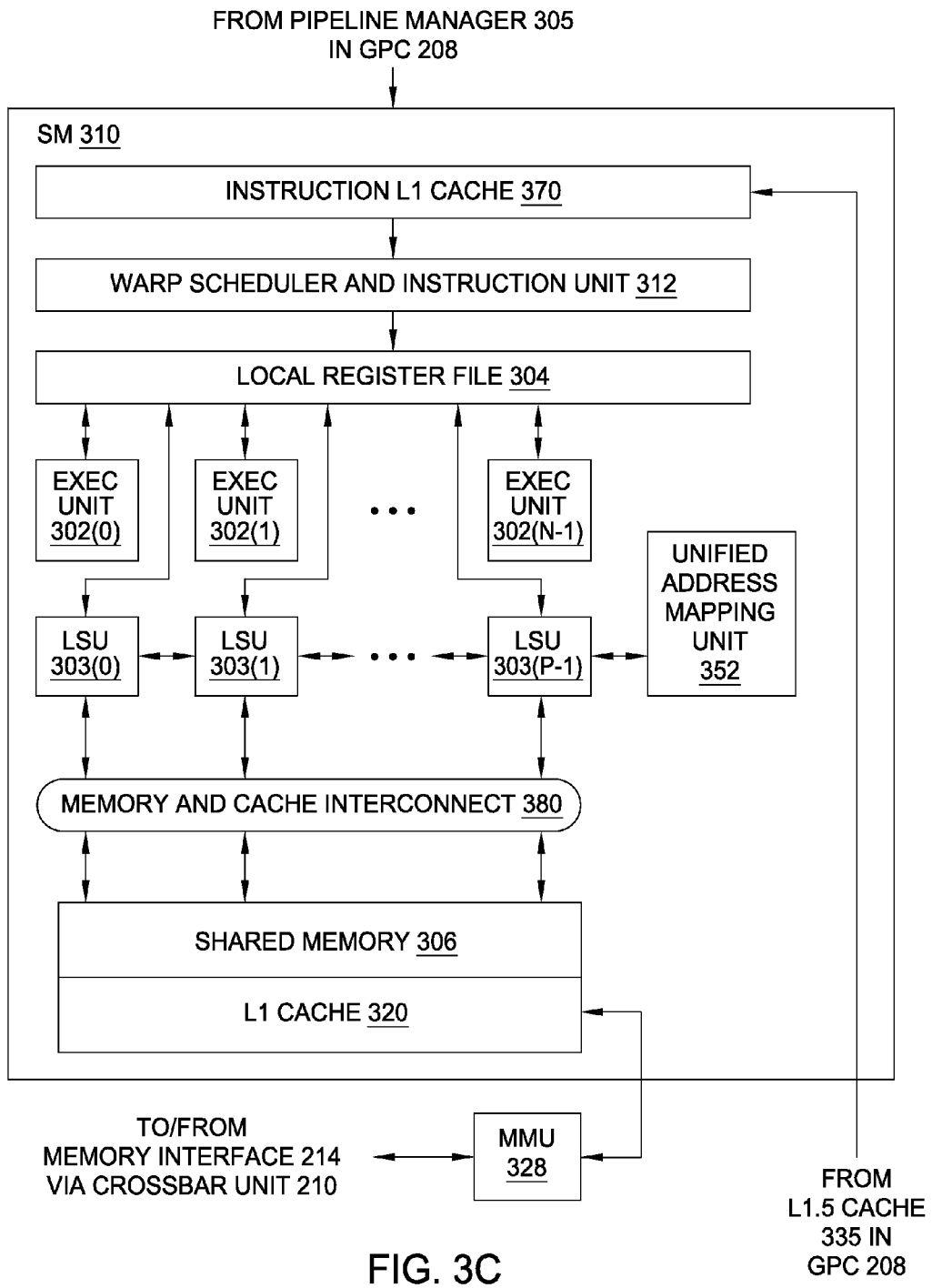
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
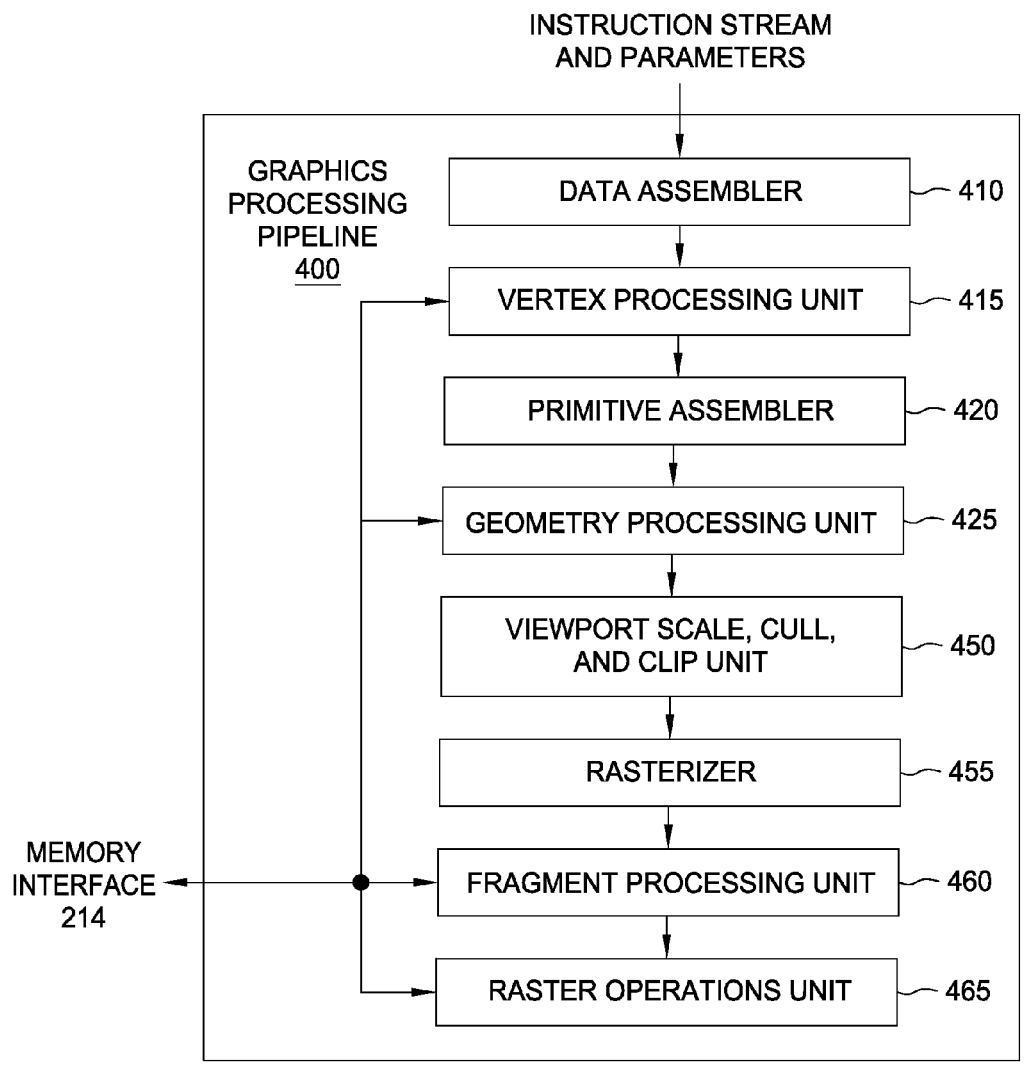
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Accessing Content-Addressable Memory

As mentioned above in conjunction with FIG. 3B, texture unit 315 shown in FIG. 3B is configured to perform texture processing operations on behalf of SM 310 (also shown in FIG. 3B). For example, SM 310 could implement texture unit 315 in order to perform one or more texture-related operations associated with graphics processing pipeline 400 shown in FIG. 4. In addition, SM 310 could also implement texture unit 315 to perform generic processing operations that make use of existing texture data pathways.

When operating in conjunction with SM 310, texture unit 315 is configured to read texture data from any of the memory units shown in FIGS. 1-3C. In addition, texture unit 315 can also be configured to perform generic memory access operations in order to read arbitrary data from those memory units using the existing texture data pathways mentioned above. When SM 310 is configured to perform general purpose processing operations, texture unit 315 can be configured to implement a texture processing pipeline, discussed below in conjunction with FIG. 5. The texture processing pipeline discussed below allows texture unit 315 to perform generic data access operations or texture data access operations via the same data pathway.

Figure 5:
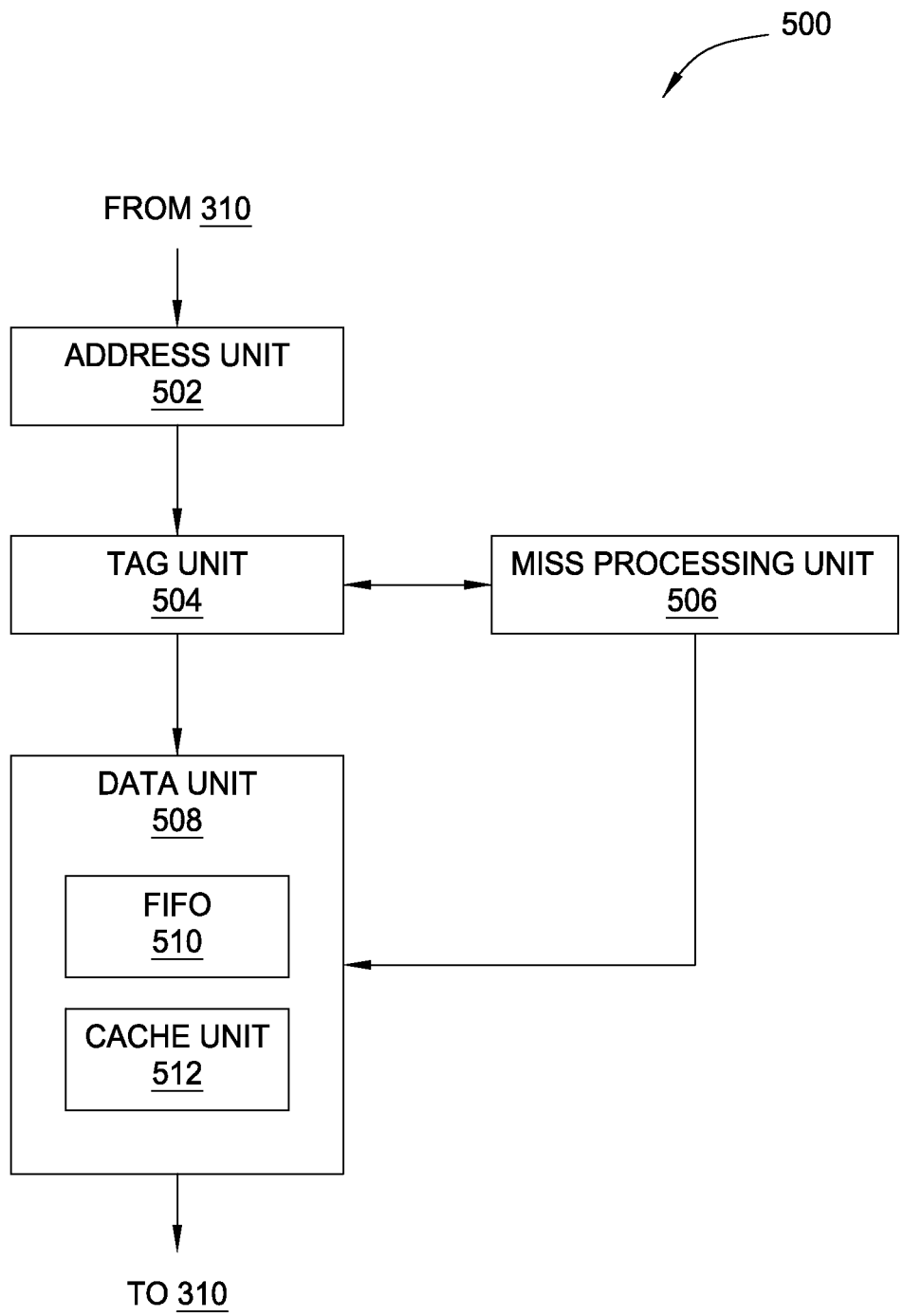
FIG. 5 is a conceptual diagram of a texture processing pipeline that a texture unit within the general processing cluster of FIG. 3B can be configured to implement, according to one embodiment of the present invention.

FIG. 5 is a conceptual diagram of a texture processing pipeline 500 that texture unit 315 within the general processing cluster 208 of FIG. 3B can be configured to implement, according to one embodiment of the present invention. As shown, texture processing pipeline 500 includes an address unit 502, a tag unit 504, a miss processing unit 506, and a data unit 508 that includes a first-in first out (FIFO) 510 and a cache unit 512.

Texture processing pipeline 500 is configured to process memory access requests received from SM 310 shown in FIG. 3B. A given memory access request could represent a texture data access operation, such as, e.g., a read operation that reads a texture from memory. Alternatively, a given memory access request could represent a generic data access operation, such as, e.g., a global memory load operation. Texture processing pipeline 500 may service memory access requests associated with multiple different threads associated with a given thread group, and those memory access requests may represent generic (i.e., non-texture) data access operations or texture data access operations.

In situations where texture processing pipeline 500 is configured to perform generic data access operations, address unit 502 may receive a memory access request from SM 310 shown in FIG. 3B that includes a virtual address. The virtual address includes a tag portion, an index portion, and an offset portion. The tag portion may represent the most significant bits (MSBs) of the virtual address, while the offset portion may represent the least significant bits (LSBs) of the virtual address. Address unit 502 is configured to parse the virtual address within the memory access request into the tag, index, and offset portions.

Tag unit 504 receives the tag, index, and offset portions of the virtual address from address unit 502 and performs a tag lookup procedure. In doing so, tag unit 504 determines whether data associated with the memory access request resides within cache unit 512. Tag unit 504 performs the tag lookup procedure by accessing a collection of content-addressable memory units (CAMs) and identifying a particular CAM that may store the tag. Tag unit 504 identifies the particular CAM by implementing a set hashing function that computes a CAM number based on the tag portion of the virtual address. For example, the set hashing function could identify the first, second, third, or fourth CAM in a collection of four CAMs based on the tag portion of the virtual address. The CAMs within tag unit 504 and the set hashing function used to identify a particular CAM are described in greater detail below in conjunction with FIG. 6.

When tag unit 504 determines that the tag portion resides within one of the CAMs mentioned above, indicating a cache hit, then tag unit 504 extracts a slot number from that CAM. The slot number represents a cache line within cache unit 512. Tag unit 504 pushes the slot number into FIFO 510. Cache unit 512 pops the slot number form FIFO 510, when that slot number becomes available, and then retrieves data associated with that slot number from the corresponding cache line.

When tag unit 504 determines that the tag portion does not reside within one of the CAMs mentioned above, indicating a cache miss, then tag unit 504 passes the tag and offset portions of the virtual address to miss processing unit 506. Subsequent accesses to one of the CAMs based on that tag portion may then be determined to be hits, as data associated with that tag portion will be retrieved and pushed into the cache unit 512. Those accesses may be determined to be hits until a CAM entry associated with the tag portion is invalidated or replaced. Miss processing unit 506 performs a virtual to physical address translation, and then accesses data stored at a physical location associated with the resultant physical address. Miss processing unit 506 then provides the retrieved data to data unit 508.

Once data associated with the memory access request becomes available, e.g. the data is read from cache unit 512 or retrieved from global memory by miss processing unit 506, then data unit 508 provides the requested data back to SM 310. In this fashion, texture processing pipeline 500 can be configured to service a memory access request on behalf of one or more threads within a thread group.

Figure 6:
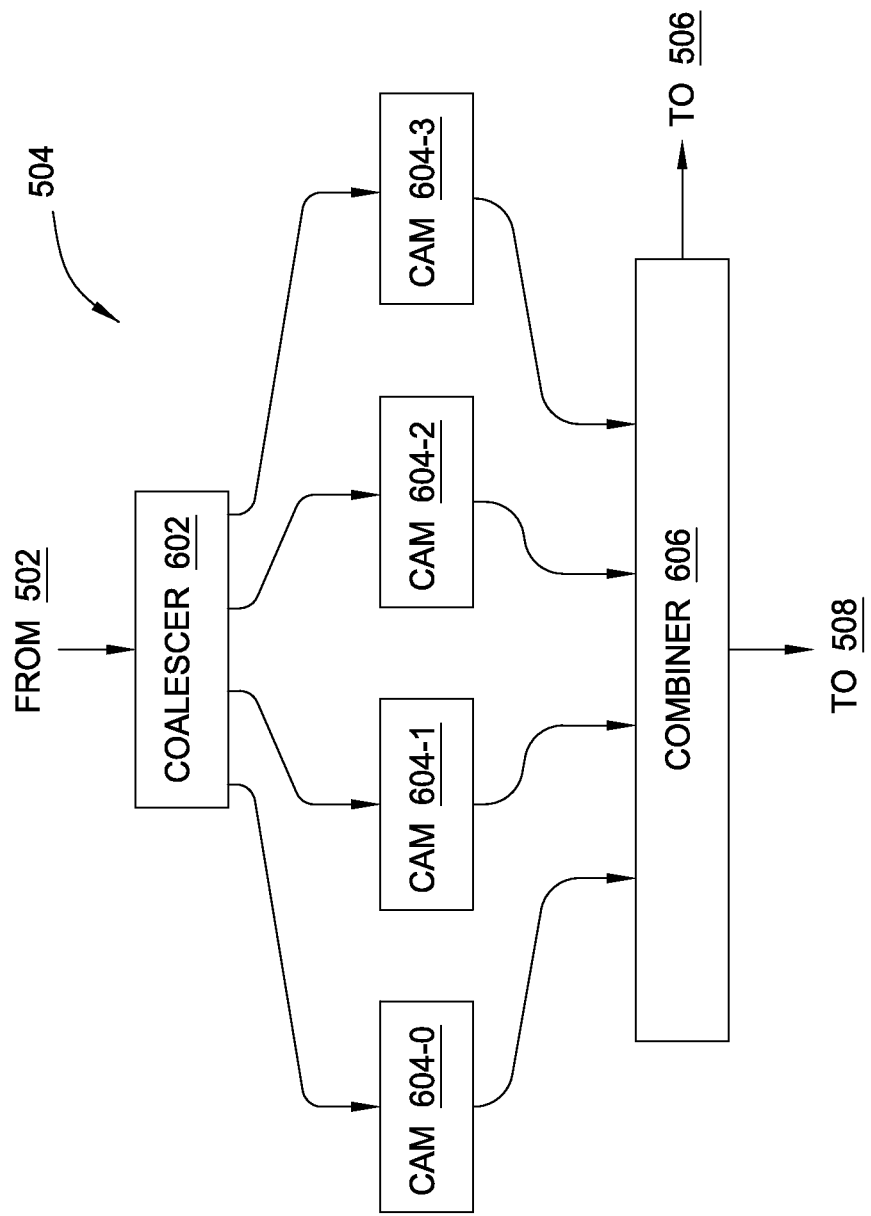
FIG. 6 is a conceptual diagram of a tag unit that resides within the texture processing pipeline of FIG. 5, according to one embodiment of the present invention.

FIG. 6 is a conceptual diagram of tag unit 504 that resides within texture processing pipeline 500 of FIG. 5, according to one embodiment of the present invention. As shown, tag unit 504 includes a coalescer 602 coupled to CAMs 604-0, 604-1, 604-2, and 604-3. Each of CAMs 604 is coupled to a combiner 606.

When tag unit 504 processes a memory access operation, coalescer 602 receives tag, index, and offset portions of a virtual address associated with that memory access request from address unit 502. Coalescer 602 may also receive multiple tag, index, and offset portions simultaneously, where each set of tag, index, and offset portions corresponds to a different memory access request. As mentioned above, each such memory access request may be associated with a different thread within a thread group executing on texture processing pipeline 500 shown in FIG. 5.

For a given memory access request and corresponding tag, index, and offset portions of the associated virtual address, coalescer 602 is configured to determine whether the tag portion resides within one of CAMs 604. In doing so, coalescer 602 is configured to implement the set hashing function mentioned above in conjunction with FIG. 5. In one embodiment, address unit 502 shown in FIG. 5 implements the set hashing function described herein. The set hashing function computes a CAM number based on the tag, index, and offset portions of the virtual address. In one embodiment, coalescer 602 may receive multiple memory access requests for the same data, and may "coalesce" these requests into just one request. Coalescer 606 may process this "coalesced" request as a single request, and implement the set hashing function just once for that coalesced request.

Once a given CAM 604 has been identified, coalescer 602 passes the tag portion of the virtual address to the identified CAM 604. The identified CAM 604 may then determine that the tag resides within that CAM 604 (indicating a cache hit), or may determine that the tag does not reside within that CAM 604 (indicating a cache miss).

In the case of a cache hit, the identified CAM 604 provides a slot number stored within that CAM 604 along with the tag portion to combiner 606. Combiner 606 is configured to accumulate slot numbers and then pass those slot numbers to FIFO 510 in like fashion as described above in conjunction with FIG. 5.

In the case of a cache miss, the identified CAM 604 provides the tag, index, and offset portions of the virtual address to combiner 606, which may then accumulate virtual address portions associated with cache misses and pass this information to miss processing unit 506. Miss processing unit 506 then processes these cache misses in the fashion described above in conjunction with FIG. 5.

Coalescer 602 is configured to implement the set hashing function of the present invention in order to compute a CAM number by performing a sequence of steps. First, coalescer 606 splits the virtual address into lower, middle, and upper portions, where the upper portion includes some of the MSBs, and the lower portion includes some of the LSBs. Coalescer 606 discards the lower portion and then splits the upper portion into an even-bit portion and an odd-bit portion The even-bit portion includes bits of the upper portion having an even index, and the odd-bit portion includes bits of the upper portion having an odd index.

Then, coalescer 606 reduces the even-bit portion to a first bit using a XOR tree and also reduces the odd-bit portion to a second bit using a XOR tree. Coalescer 602 then combines the first bit and the second bit with the middle portion of the virtual address. In one embodiment, the middle portion of the virtual address includes two bits, and coalescer 602 combines the first bit, second bit, and the middle portion by concatenating the first and second bits into two bits and then adding the result to the middle portion of the virtual address. The result of combining the first bit, second bit, and middle portion is a two bit binary number that represents a CAM number.

Coalescer 602 is configured to implement the set hashing function described above when configured to do so by a software application that executes on general processing cluster 208. Coalescer 602 may also be configured by the software application to implement other set hashing functions. In one embodiment, the set hashing function uses Galois division based on a primitive polynomial to produce a division residue. The residue can be calculated by iteratively applying the primitive polynomial as a XOR filter to an input address that is left-shifted after each iteration. The filter result feeds back into the lowest bit of the residue calculation until the process is complete. The process is complete when all bits of the original input address have been consumed by the left-shifts.

One hardware implementation may use the iterative steps taken in calculating the division residue to define a parallel XOR tree based upon the primitive polynomial. Each output bit is defined by a separate XOR tree, however many terms in the tree may be used multiple times across all output bits, optionally allowing for a more efficient implementation. The trees are specified in this way to ensure that the set hashing function will generate an even distribution of values across the full range of input virtual addresses. The relevant number of bits of this calculation may then be used to represent the CAM number. Coalescer 602 is configured to implement a set hashing function, such as those described herein, in order to query CAMs 604 when processing a virtual address, or when updating those CAMs to include tag portions of virtual addresses for which data was recently cached.

Figure 7:
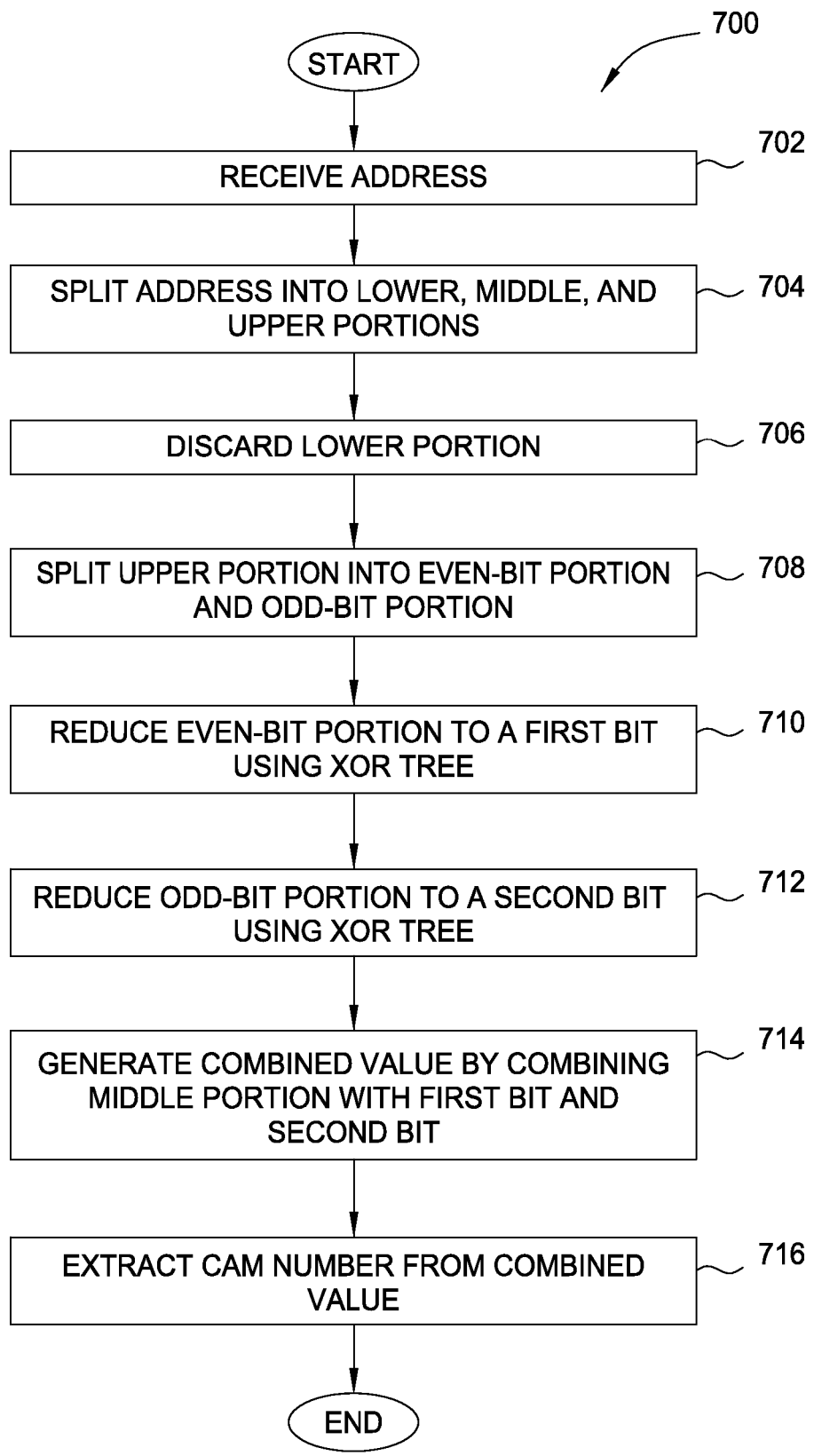
FIG. 7 is a flow diagram of method steps for performing a set hashing function that may be implemented by the coalescer of FIG. 6, according to one embodiment of the present invention.

FIG. 7 is a flow diagram of method steps for performing a set hashing function, according to one embodiment of the present invention. Although the method steps are described in conjunction with the systems of FIGS. 1-3, persons of ordinary skill in the art will understand that any system configured to perform the method steps, in any order, is within the scope of the invention.

As shown, a method 700 begins at step 702, where coalescer 602 shown in FIG. 6 receives a virtual address from address unit 502 shown in FIG. 5. The virtual address is associated with a memory access request being processed by texture processing pipeline 500 for one or more threads within a thread group.

At step 704, coalescer 606 splits the virtual address into lower, middle, and upper portions, where the upper portion includes some of the MSBs, and the lower portion includes some of the LSBs. At step 706, coalescer 606 discards the lower portion. At step 708, coalescer 606 splits the upper portion into an even-bit portion and an odd-bit portion. The even-bit portion includes bits of the upper portion having an even index, and the odd-bit portion includes bits of the upper portion having an odd index.

At step 710, coalescer 606 reduces the even-bit portion to a first bit using a XOR tree. At step 712, coalescer 606 reduces the odd-bit portion to a second bit using a XOR tree. At step 714, coalescer 602 combines the first bit and the second bit with the middle portion of the virtual address. In one embodiment, the middle portion of the virtual address includes two bits, and coalescer 602 combines the first bit, second bit, and the middle portion by concatenating the first and second bits into two bits and then adding the resultant two bits to the middle portion of the virtual address. At step 716, coalescer 602 extracts a CAM number from the combined value. The combined value generated by combining the first bit, second bit, and middle portion is a two bit binary number that represents the CAM number. The method 700 then ends.

Figure 8:
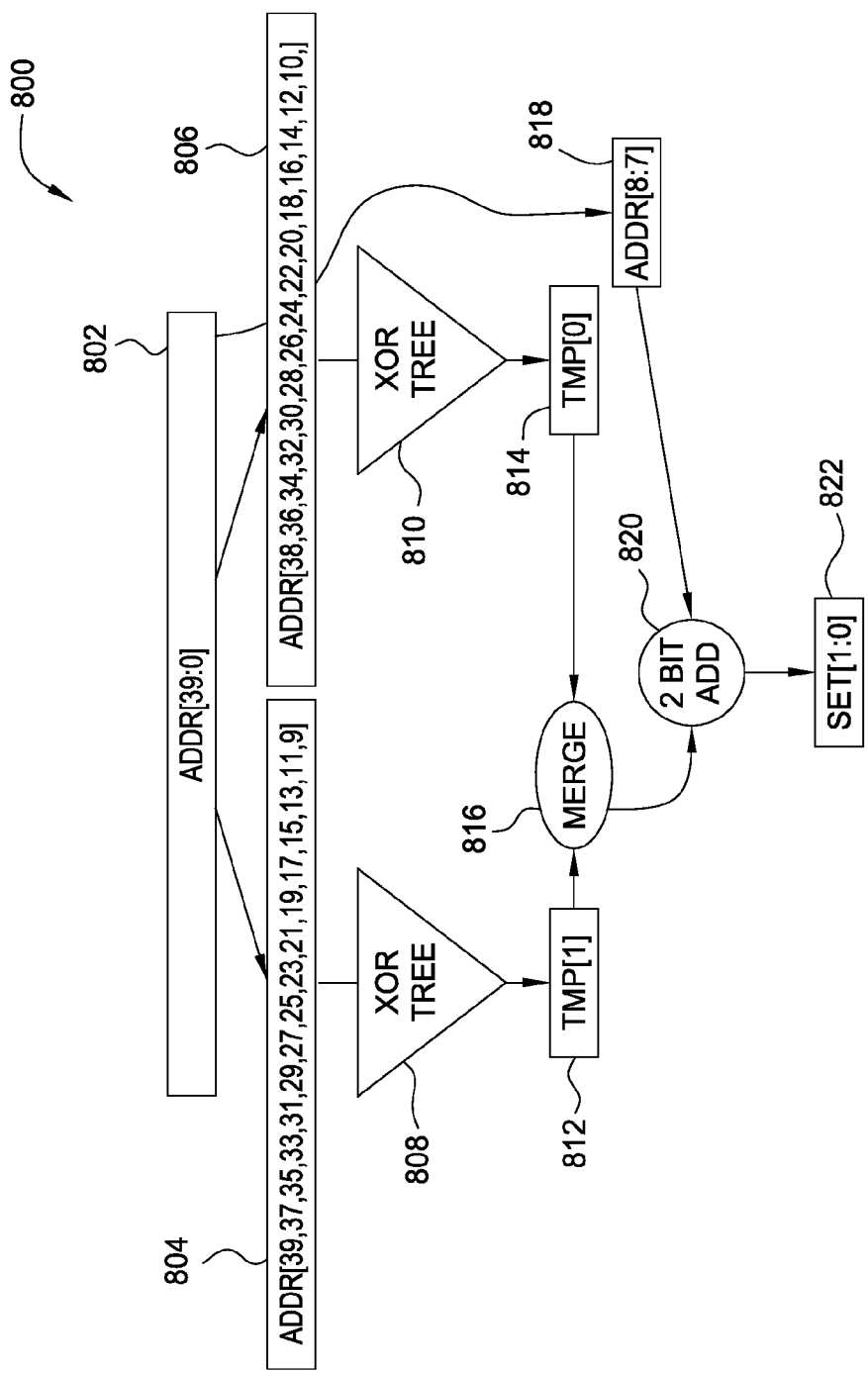
FIG. 8 is a conceptual diagram of an exemplary circuit configured to perform the set hashing function described in conjunction with FIG. 7, according to one embodiment of the present invention.

FIG. 8 is a conceptual diagram of an exemplary circuit 800 configured to perform the set hashing function described in conjunction with FIG. 7, according to one embodiment of the present invention. As shown, circuit 800 splits a middle portion of a virtual address 802 into odd-bit portions 804 and even-bit portions 806. The lower 8 bits of virtual address 802 may be discarded. XOR tree 810 reduces even-bit portions 806 down to a first bit 814, and XOR tree 808 reduces odd-bit portions 808 down to a second bit 812. Merge 816 concatenates first bit 814 with second bit 812, and then 2-bit add 820 adds the resultant two bits to middle portion 818. Middle portion 818 represents the $7^{th}$ and $8^{th}$ bits of virtual address 802. The output of 2-bit add 820 is a two-bit binary number that represents the CAM number.

By implementing the set hashing technique described herein, coalescer 602 is capable of distributing CAM accesses associated with different memory access requests across different CAMs 604, thereby improving CAM resource usage. With this approach, different CAMs 604 are capable of retrieving tag information associated with different memory access requests in parallel with one another, thereby increasing the speed with which tag unit 504 as a whole is capable of servicing multiple memory access requests.

In sum, a tag unit configured to manage a cache unit includes a coalescer that implements a set hashing function. The set hashing function maps a virtual address to a particular content-addressable memory unit (CAM). The coalescer implements the set hashing function by splitting the virtual address into upper, middle, and lower portions. The upper portion is further divided into even-indexed bits and odd-indexed bits. The even-indexed bits are reduced to a single bit using a XOR tree, and the odd-indexed are reduced in like fashion. Those single bits are combined with the middle portion of the virtual address to provide a CAM number that identifies a particular CAM. The identified CAM is queried to determine the presence of a tag portion of the virtual address, indicating a cache hit or cache miss.

Advantageously, the set hashing function disclosed herein avoids overuse of a particular CAM, thereby utilizing CAM resources more efficiently compared to conventional approaches.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for accessing a memory module within a plurality of memory modules, the method comprising:
    parsing a virtual address into a first portion, a second portion, and a third portion;
    parsing the first portion into even-indexed bits and odd-indexed bits, wherein each of the even-indexed bits has a different even-numbered index within the virtual address and each of the odd-indexed bits has a different odd-numbered index within the virtual address;
    reducing the even-indexed bits to a first bit;
    reducing the odd-indexed bits to a second bit; and
    generating a memory module number by combining the first bit and the second bit with the second portion, wherein the memory module number identifies the memory module within the plurality of memory modules.

2. The computer-implemented method of claim 1, wherein the first portion includes one or more most significant bits of the virtual address, and the third portion includes one or more least significant bits of the virtual address.

3. The computer-implemented method of claim 1, wherein reducing the even-indexed bits to the first bit comprises processing the even-indexed bits via a first XOR tree, and wherein reducing the odd-indexed bits to the second bit comprises processing the odd-indexed bits via a second XOR tree.

4. The computer-implemented method of claim 1, wherein the second portion includes two bits, and combining the first bit and the second bit with the second portion comprises:
    concatenating the first bit with the second bit to generate a bit string; and
    performing a two-bit add between the bit string and the second portion to generate the memory module index.

5. The computer-implemented method of claim 1, wherein the memory module comprises a content-addressable memory unit (CAM) configured to store tag portions of virtual addresses and slot numbers associated with a cache memory unit.

6. The computer-implemented method of claim 5, further comprising:
    querying the memory module with a tag portion of the virtual address;
    determining that the tag portion of the virtual address is present within the memory module;
    extracting a slot number from the cache memory unit that reflects a location within the cache memory unit where data associated with the virtual address resides; and
    reading the data associated with the virtual address based on the slot number.

7. The computer-implemented method of claim 5, further comprising:
    querying the memory module with a tag portion of the virtual address;
    determining that the tag portion of the virtual address is not present within the memory module;
    performing a virtual to physical address translation with the virtual address to generate a physical address;
    reading data associated with the virtual address from a physical location associated with the physical address.

8. The computer-implemented method of claim 7, further comprising updating the cache memory unit to include data associated with the virtual address that was read from the physical location associated with the physical address.

9. A system, comprising:
    a graphics processing cluster that includes a texture unit that is configured to:
        parse a virtual address into at least a first portion and a second portion;
        parse the first portion into even-indexed bits and odd-indexed bits, wherein each of the even-indexed bits has a different even-numbered index within the virtual address and each of the odd-indexed bits has a different odd-numbered index within the virtual address;
        reduce the even-indexed bits to a first bit;
        reduce the odd-indexed bits to a second bit; and
        generate a memory module number by combining the first bit and the second bit with the second portion, wherein the memory module number identifies the memory module within the plurality of memory modules.

10. The system of claim 9, wherein the first portion includes one or more most significant bits of the virtual address.

11. The system of claim 9, wherein the texture unit is further configured to reduce the even-indexed bits to the first bit by processing the even-indexed bits via a first XOR tree, and to reduce the odd-indexed bits to the second bit by processing the odd-indexed bits via a second XOR tree.

12. The system of claim 9, wherein the second portion includes two bits, and the texture unit is further configured to combine the first bit and the second bit with the second portion by:

concatenating the first bit with the second bit to generate a bit string; and performing a two-bit add between the bit string and the second portion to generate the memory module index.

13. The system of claim 9, wherein the memory module comprises a content-addressable memory unit (CAM) configured to store tag portions of virtual addresses and slot numbers associated with a cache memory unit.

14. The system of claim 13, wherein the texture unit is further configured to:

query the memory module with a tag portion of the virtual address;

determine that the tag portion of the virtual address is present within the memory module;

extract a slot number from the cache memory unit that reflects a location within the cache memory unit where data associated with the virtual address resides; and read the data associated with the virtual address based on the slot number.

15. The system of claim 13, wherein the texture unit is further configured to:

query the memory module with a tag portion of the virtual address;

determine that the tag portion of the virtual address is not present within the memory module;

perform a virtual to physical address translation with the virtual address to generate a physical address;

reading data associated with the virtual address from a physical location associated with the physical address.

16. The system of claim 15, wherein the texture unit is further configured to update the cache memory unit to include data associated with the virtual address that was read from the physical location associated with the physical address.

17. A computing device, comprising:

a memory; and a processor that is coupled to the memory and includes at least one texture unit configured to:

parse a virtual address into a first portion and a second portion;

parse the first portion into even-indexed bits and odd-indexed bits;

reduce the even-indexed bits to a first bit;

reduce the odd-indexed bits to a second bit; and generate a memory module number by combining the first bit and the second bit with the second portion, wherein the memory module number identifies the memory module within the plurality of memory modules.

18. The computing device of claim 17, wherein the texture unit is configured to reduce the even-indexed bits to the first bit by processing the even-indexed bits via a first XOR tree and reduce the odd-indexed bits to the second bit by processing the odd-indexed bits via a second XOR tree.

19. The computing device of claim 17, wherein the second portion includes two bits, and the texture unit is configured to combine the first bit and the second bit with the second portion by:

concatenating the first bit with the second bit to generate a bit string; and performing a two-bit add between the bit string and the second portion to generate the memory module index.

* * * * *